W. D. ALLEN.
INCLOSED HOSE RACK.
APPLICATION FILED FEB. 24, 1908.
933,947.
Patented Sept. 14, 1909.
3 SHEETS—SHEET 1.
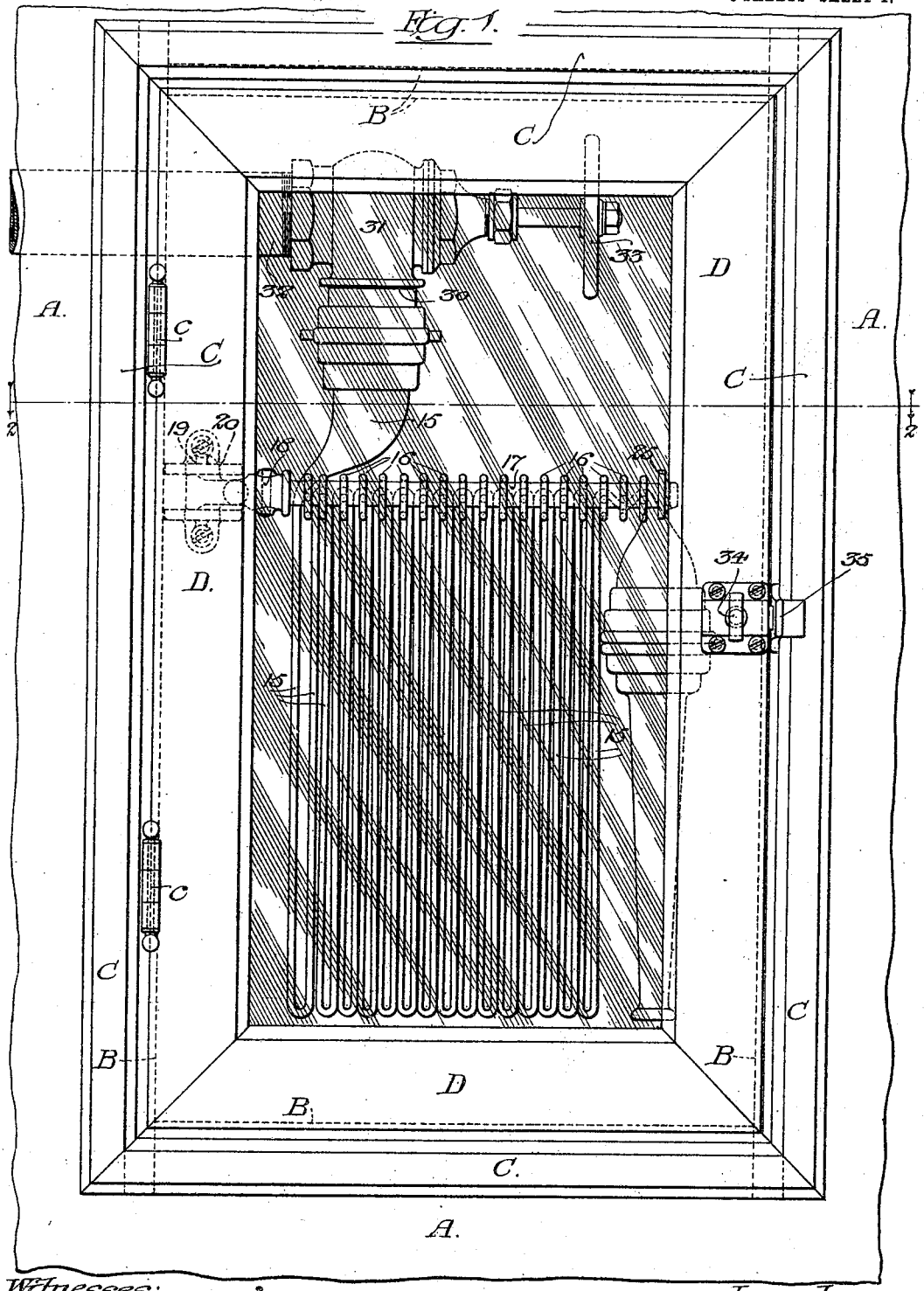

W. D. ALLEN.
INCLOSED HOSE RACK.
APPLICATION FILED FEB. 24, 1908.
933,947.
Patented Sept. 14, 1909.
3 SHEETS—SHEET 2.
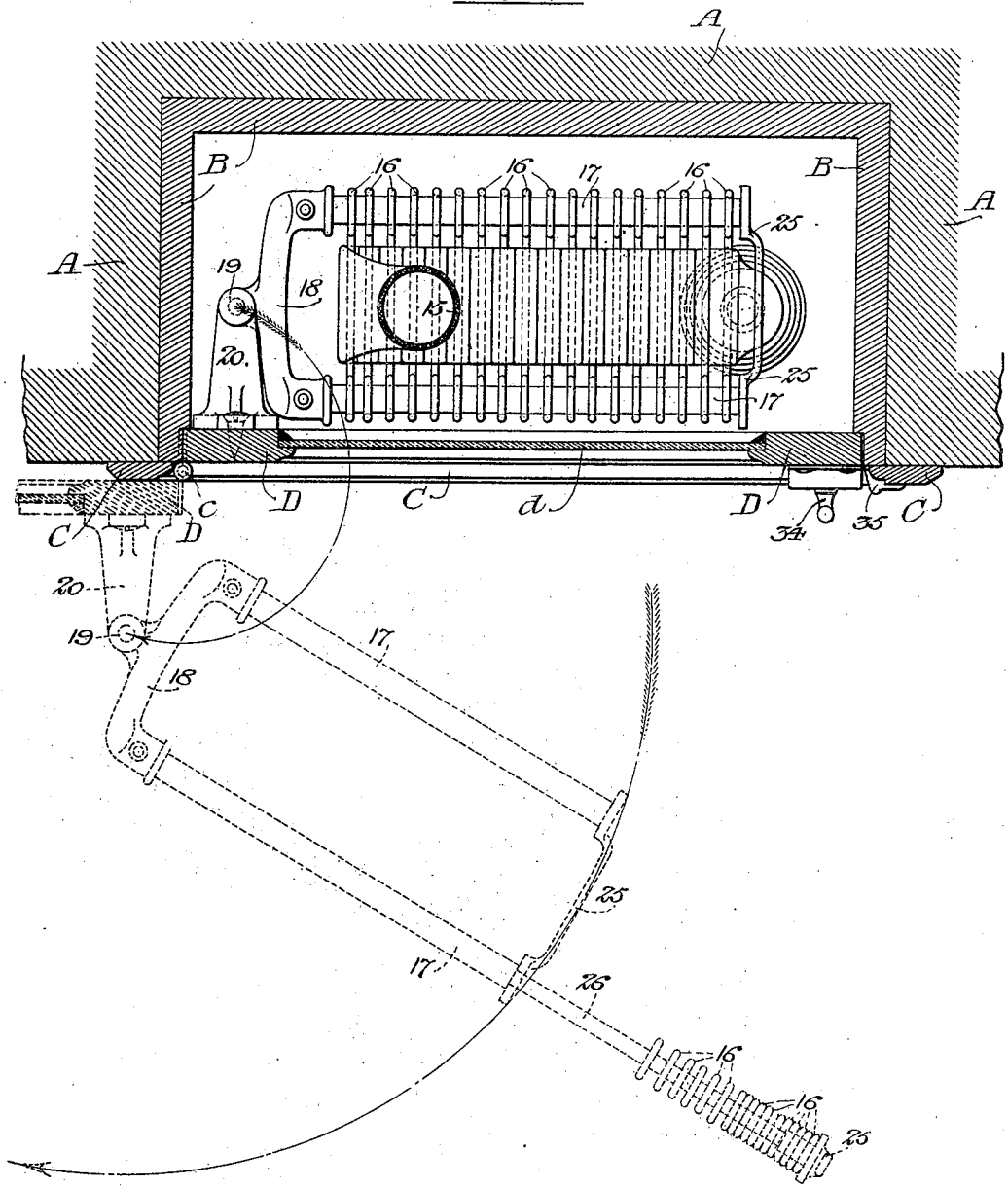

W. D. ALLEN.
INCLOSED HOSE RACK.
APPLICATION FILED FEB. 24, 1908.
933,947.
Patented Sept. 14, 1909.
3 SHEETS—SHEET 3.
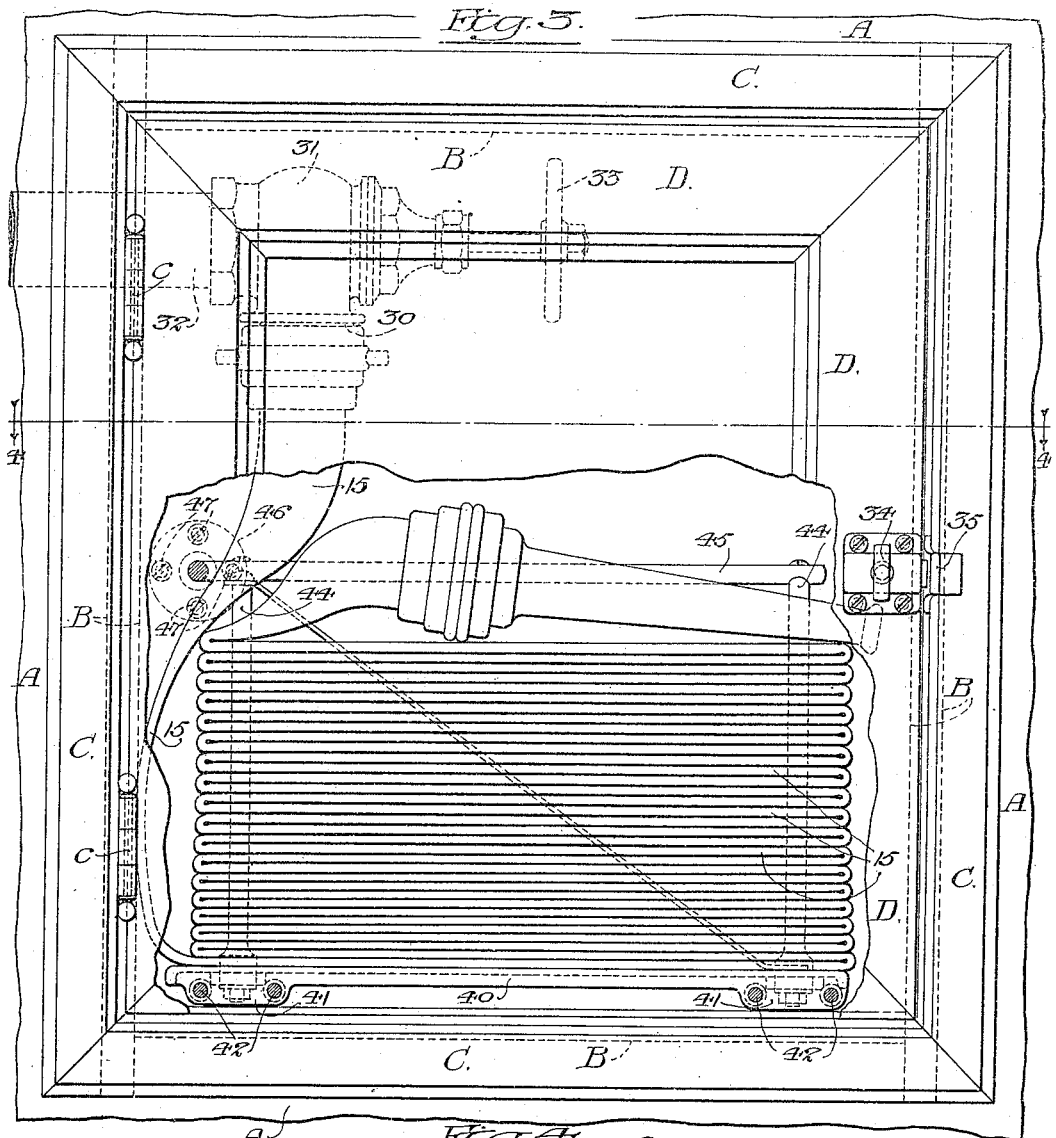
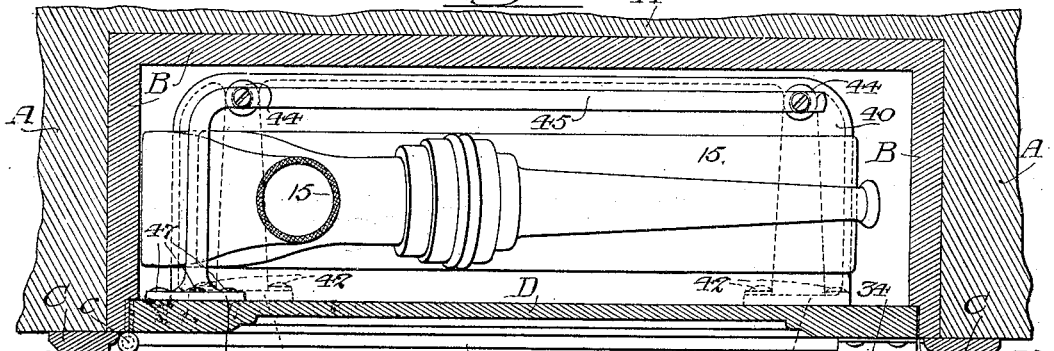

UNITED STATES PATENT OFFICE.

WILLIAM D. ALLEN, OF CHICAGO, ILLINOIS, ASSIGNOR TO W. D. ALLEN MANUFACTURING COMPANY, OF CHICAGO, ILLINOIS, A CORPORATION.

INCLOSED HOSE-RACK.

933,947.

Specification of Letters Patent.   Patented Sept. 14, 1909.

Application filed February 24, 1908.   Serial No. 417,236.

*To all whom it may concern:*

Be it known that I, WILLIAM D. ALLEN, a citizen of the United States, and a resident of Chicago, in the county of Cook and State of Illinois, have invented certain new and useful Improvements in Inclosed Hose-Racks, of which I do declare the following to be a full, clear, and exact description, reference being had to the accompanying drawings, forming part of this specification.

The present invention has for its object to provide means whereby fire hose may be suspended within a wall cabinet in such a manner that when the cabinet is open the hose may be quickly drawn from the rack in any desired direction.

The invention consists in the features of novelty hereinafter described, illustrated in the accompanying drawings and particularly pointed out in the claims at the end of this specification.

Figure 1 is a view in front elevation of a hose rack cabinet embodying my invention. Fig. 2 is a cross section on line 2—2 of Fig. 1. Fig. 3 is a view similar to Fig. 1, but showing a modified form of the invention. Fig. 4 is a view in cross section on line 4—4 of Fig. 3.

Referring to the form of the invention shown in Figs. 1 and 2 of the drawings, A designates a wall that is formed with a recess to receive a cabinet B, and C designates the door-frame of the cabinet. It is not essential that the body portion of the cabinet be employed, if the recess in the wall A is suitably finished and if the outer door-frame C be otherwise properly held in place around the recess in the wall. To the frame C is hinged, as at $c$, the door D of the cabinet, this door D being provided preferably with a glass front $d$ through which the rack or hose within the cabinet may be exposed to view.

As shown in Figs. 1 and 2, the fire hose 15 is suspended in loops or festoons from the links 16 that are carried by the side arms 17 of the rack, these links 16 being mounted in manner free to slide upon the arms 17, which arms are connected to a head or yoke 18 that is pivotally connected as at 19 to a bracket 20 that is secured to the inner face of the door D. The form of hose rack illustrated is not essential to my invention, and any suitable support adapted to sustain the hose may be employed. The form of rack shown is what is commonly known upon the market as the "Bowes rack," and is provided at its outer end with a guard bar 25 having a stem 26 adapted to sit telescopically within one of the arms 17 of the rack and to drop downwardly when the hose is pulled off the rack, as shown by dotted lines in Fig. 2. The hose 15 is shown as coupled to a pipe 30 that leads downwardly from the valve casing 31 secured to the inner end of a supply pipe 32, the valve casing 31 being provided with a hand-wheel 33 whereby the supply of water may be turned off or on. The door D is shown as provided with a latch 34, the bolt of which is adapted to engage a plate 35 suitably secured to the casing C.

From the foregoing description it will be seen that when the hose is out of use it may be suspended in pendent loops or festoons from the pins 16 of the hose rack and behind the cabinet door D through which it may be seen. When the hose is to be used, the handle of the latch 34 will be grasped and the door will be swung open to the position shown by dotted lines in Fig. 2. When the door D is thus swung open, the hose rack will be carried outward, as indicated in Fig. 2 of the drawings, so that the attendant may run with the hose in any desired direction as it is drawn from the rack. Thus, for example, if it be assumed that the hose rack is mounted within a recess of the wall at one side of a hallway, as is customary, the attendant may grasp the nozzle of the hose and run with it in either direction along the hallway without danger of any straining or breakage of the parts, since the hose rack, after the door is opened, will swing about its pivotal point 19 in either direction. By thus supporting the hose rack so that when the cabinet door is opened the rack is brought outside the front of the cabinet, a very advantageous result is effected.

In Figs. 3 and 4 of the drawings the construction of the cabinet is the same as that hereinbefore shown and described, and the same characters of reference are employed upon the parts of the cabinet, as in Figs. 1 and 2 of the drawings. In this form of the invention, however, a different form of hose rack is illustrated. As shown, this rack consists of a base plate 40 having depending flanges 41 through which pass the bolts 42 whereby the base of the rack is connected to the door. From the inner portion of the base 40 rise the standards 44 at front and rear, these standards being connected at their tops by the upper bar 45. As shown, this bar 45 is bent around the rear end of the rack and is provided with an expanded base portion 46 that is secured as at 47 to the door D of the cabinet. The hose 15 is laid upon the base 40 of the rack in superposed folds, the nozzle of the hose being shown at the top of the rack; and it will be understood that the opposite end of the hose will be connected to the water supply pipe in the usual manner.

From the foregoing description it will be seen that when it is desired to use the hose 15, the handle of the latch 34 will be turned and the door D will be swung open. This swinging open of the door will bring the hose rack outside the cabinet and the hose can be drawn from off the hose rack in any desired direction. It is obvious that other forms of hose rack may be employed. I have merely shown two well-known types of hose rack for convenience of illustrating the main feature of the invention. The term "hose rack" is used herein in a generic sense and is designed to include revoluble racks (i. e., reels) as well as others.

Having thus described my invention, what I claim as new, and desire to secure by Letters Patent, is:—

1. The combination with the door frame and a horizontally swinging door, of a hose rack pivotally mounted upon the inner side of said door to swing therewith and independently thereof in horizontal direction.

2. The combination with the door frame and a horizontally swinging door, of a hose rack pivotally mounted upon the inner side of said door adjacent one edge thereof so as to swing in horizontal direction.

3. The combination with the door frame and a horizontally swinging door, of a bracket mounted upon the inner side of said door and a hose rack pivotally connected to said bracket to swing in horizontal direction, said bracket projecting sufficiently from the inner side of the door to permit the hose rack to swing to a position parallel to the plane of the door.

WILLIAM D. ALLEN.

Witnesses:
   Geo. P. Fisher, Jr.,
   Katharine Gerlach.